Feb. 27, 1962 J. R. McCORDIC 3,022,678
TUNNEL MOUNTED GEARSHIFT
Filed Jan. 26, 1960 3 Sheets-Sheet 3
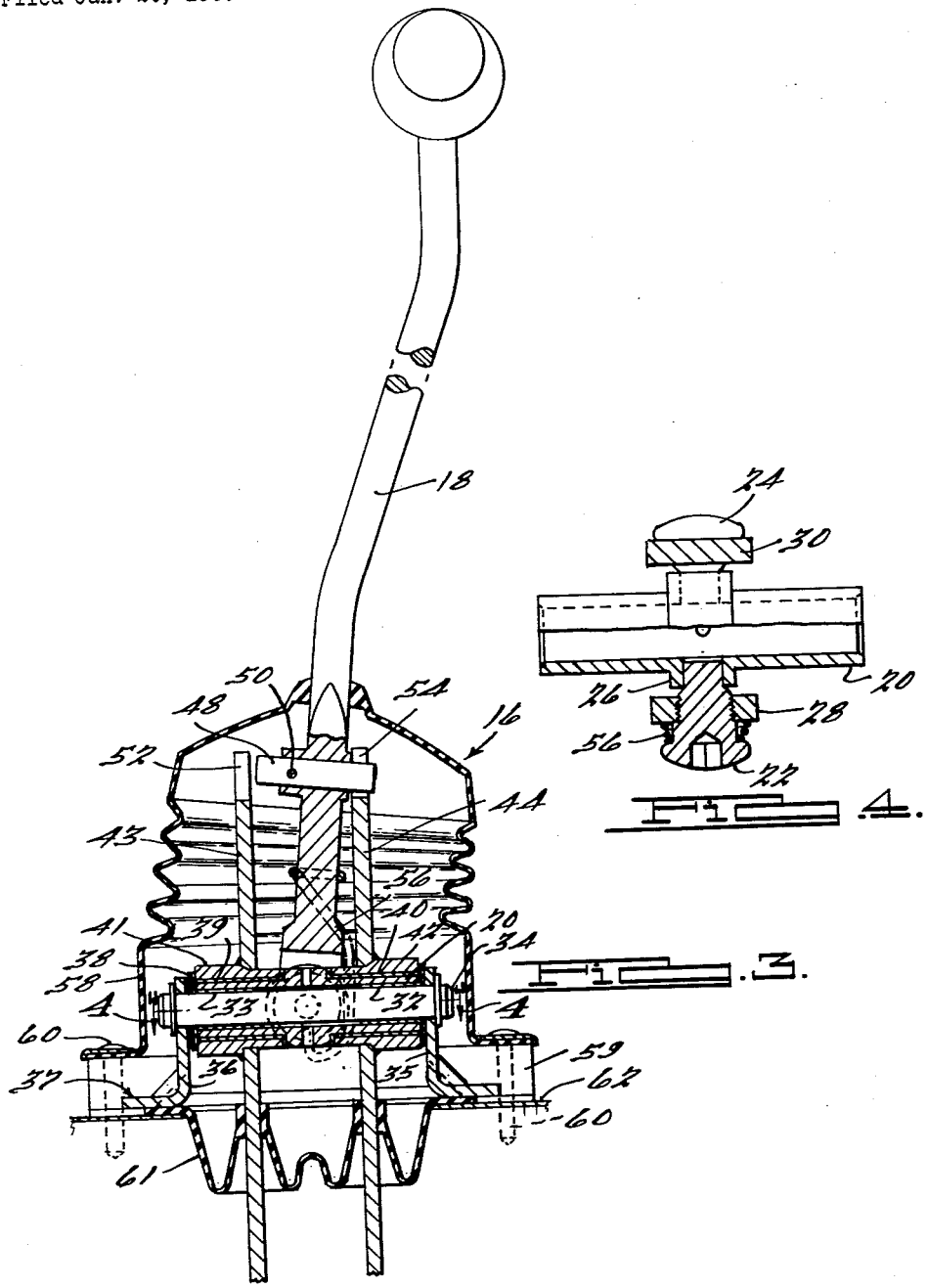
INVENTOR.
James R. McCordic.
BY
Harness and Harris
ATTORNEYS.

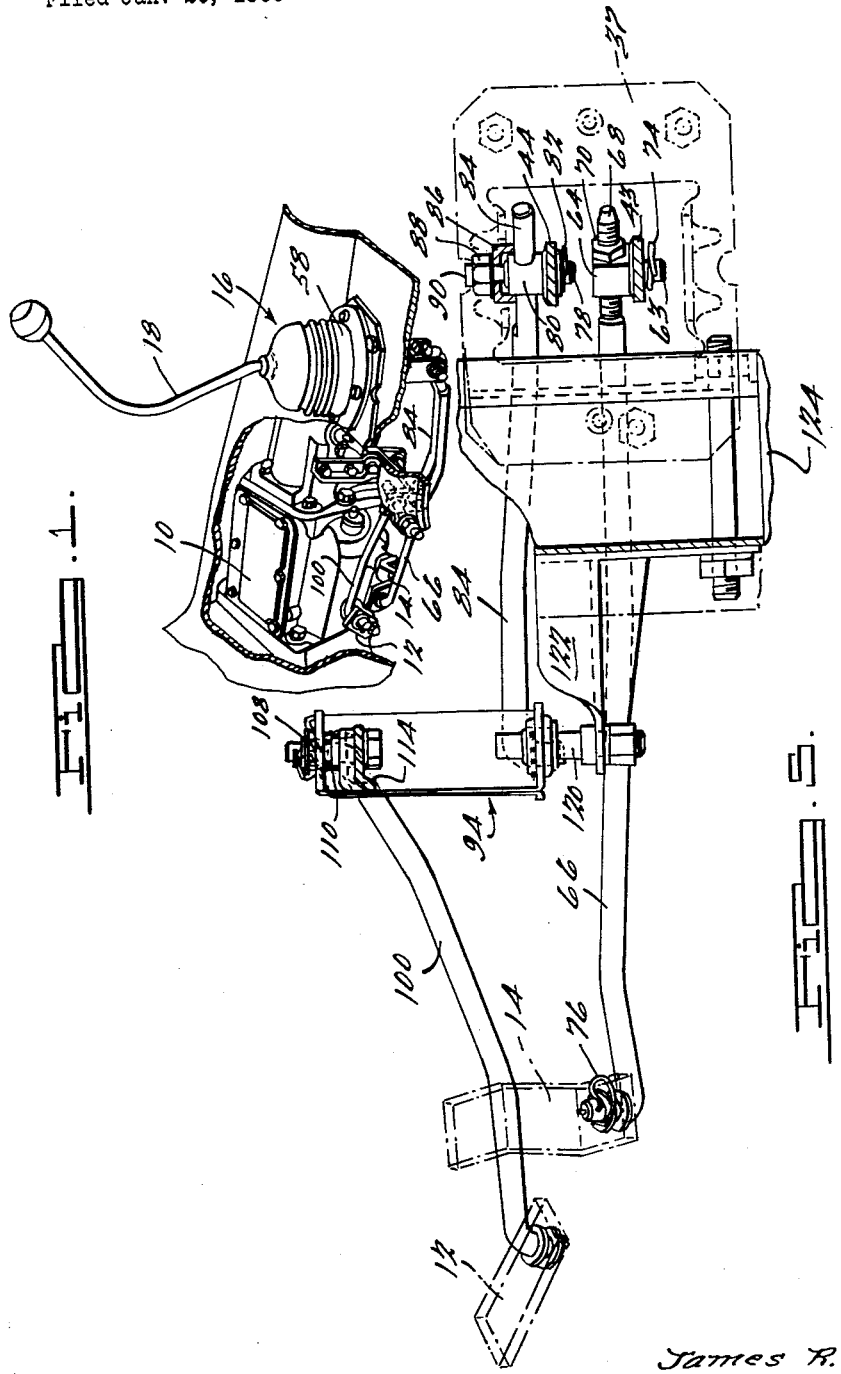

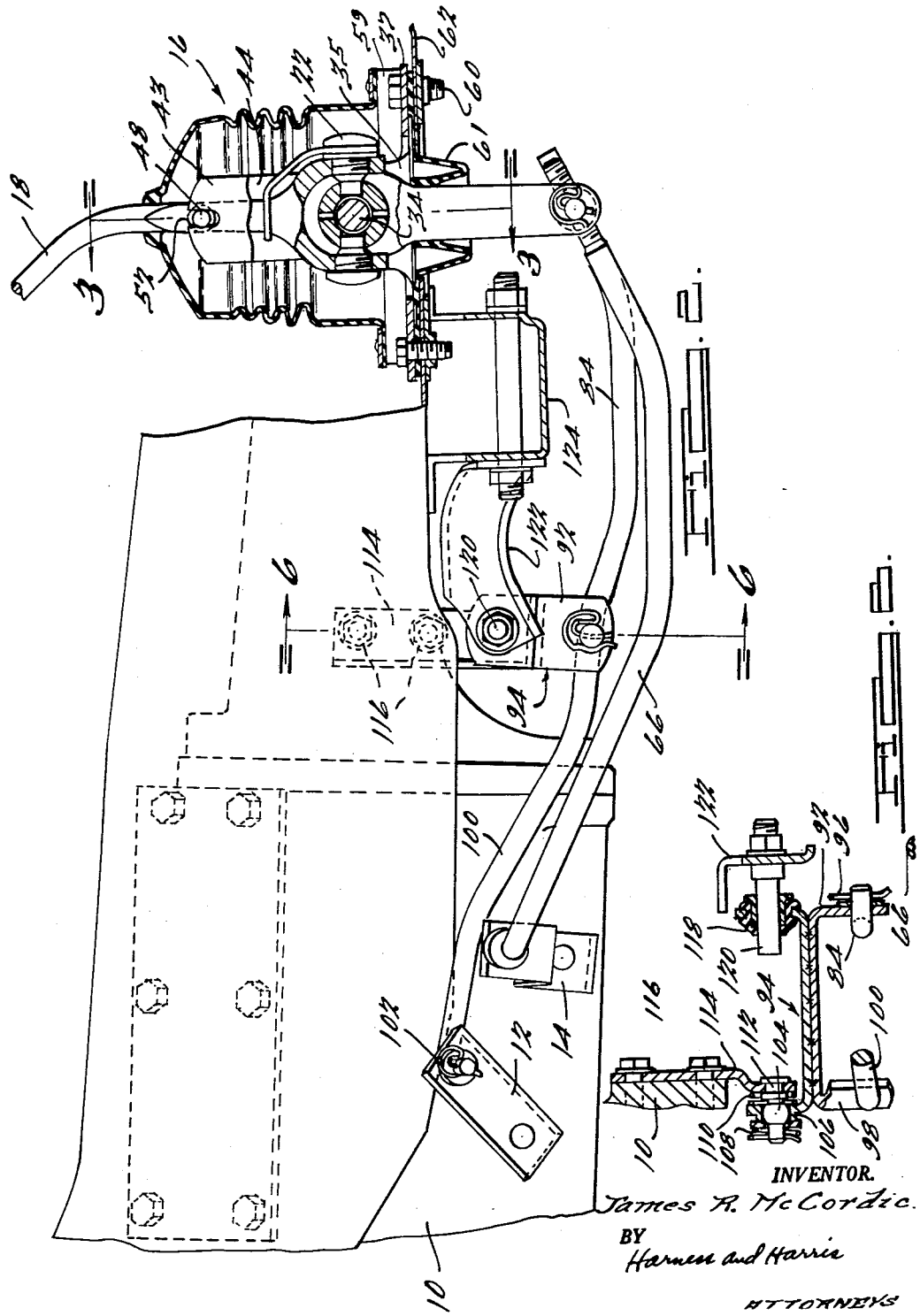

United States Patent Office 3,022,678
Patented Feb. 27, 1962

3,022,678
TUNNEL MOUNTED GEARSHIFT
James R. McCordic, Royal Oak, Mich., assignor to Chrysler Corporation, Highland Park, Mich., a corporation of Delaware
Filed Jan. 26, 1960, Ser. No. 4,814
1 Claim. (Cl. 74—473)

This invention relates to a manually operable gearshift mechanism and mounting therefor for use in combination with a manually shiftable transmission of an automotive vehicle, such as the transmission shown in Patent 2,299,889.

The present invention provides a novel type of transmission shifting mechanism comprising a hand shift lever and gear train selecting levers engageable thereby and operably connected to shifting arms mounted on the transmission and extending thereinto to engage gear shifting yokes. The gear train selecting levers are pivotally mounted on the same support that the hand lever is mounted on. Each selecting lever is provided with upstanding portions substantially parallel to and lying on either side of the hand lever and engageable therewith, and is also provided with depending portions extending below their pivot axis oppositely to the upstanding portions and are connected to the proper gear train shifting arms on the transmission.

A novel feature of this invention is that the hand lever is provided with a means which can simultaneously engage both of the selecting levers at the neutral position of each. This feature allows the adjustable linkage connecting the selecting levers to the shifting arms to be properly set in the neutral position by merely placing the hand lever means into engagement with each of the selecting levers and thereafter adjusting the linkages to place the gear shifting yokes of the transmission in their neutral position.

Another advantage of this feature is that each of the selecting levers must be brought to its neutral position before the hand lever means is disengageable therefrom and thereafter engageable with the other selecting lever. This feature prevents partial simultaneous engagement of the second-high gear train and the low-reverse gear train.

A further feature of this invention is the provision of a resilient mounting for the second-high linkage connecting the second-high shifting arm to the second-high selecting lever, which mounting prevents motor and transmission vibration being transmitted to the second-high selecting lever and hence to the hand lever.

It is therefore, a principal object of this invention to provide a relatively simple and inexpensive manual gear shifting mechanism which is provided with the aforesaid features and which prevents simultaneous engagement of the two gear trains, provides for easy initial setting of the shifting yokes and the selecting levers, and eliminates motor and transmission vibration at the hand lever.

Further objects and advantages of the present invention will become apparent from the following description and drawings in which:

FIGURE 1 represents a plan view of an automotive transmission and the gear train selecting mechanism of the present invention;

FIGURE 2 represents a partial cross-sectional side view of the gear selector mechanism;

FIGURE 3 represents a view of the gear selector mechanism of FIGURE 2 taken along the line 3—3 thereof in the direction of the arrows;

FIGURE 4 represents a partial cross sectional view of the universal mounting of the gear shifting mechanism taken along line 4—4 of FIGURE 3 in the direction of the arrows;

FIGURE 5 represents a top view of the linkage mechanism of FIGURE 2; and

FIGURE 6 represents a view of the resilient mounting of FIGURE 2 taken along the line 6—6 thereof in the direction of the arrows.

Referring to the drawings an automotive transmission 10 of the type, for example, shown in Patent No. 2,299,889 is provided with a second-high shifting arm 12 and a low-reverse shifting arm 14 connected respectively to the second-high gear train shifting yoke and the low-reverse train shifting yoke of the transmission 10. In the conventional manner, the rotation of each of these shifting arms 12 and 14 will result in a movement of the shifting yokes associated therewith into their proper gear shifting positions.

A manual shifting device 16 comprises a hand shifting stick 18 mounted on a universal joint comprising a hollow shaft 20 provided with oppositely positioned trunnions 22 and 24 threaded into depending legs 28 and 30 of lever 18 and pivotally mounted in the boss 26 on shaft 20. Shaft 20 is rotatably mounted on a pair of sleeve bearings 32 and 33 secured to opposite ends of a shaft 34 which is secured by lock washers between legs 35 and 36 of support means 37 bolted to the vehicle floor. A tolerance takeup spring 38 may be provided between a leg of the support 37 and the universal joint structure. Sleeve bearings 39 and 40 are mounted on opposite ends of shaft 20 and rotatably support shafts or collars 41 and 42 respectively to which selecting levers 43 and 44 are secured for rotation therewith.

It is seen, therefore, that levers 43 and 44 are free to pivot on shaft 20 which is free to pivot on shaft 34. Moreover, lever 18 is pivotal around shaft 34 and on trunnions 22 and 24 to thereby provide a universal joint for lever 18 allowing 360° angular movement of a limited extent.

Lever 18 is provided with an interconnecting shoulder means or pin 48 secured to lever 18 by suitable means 50, which pin 48 is movable into and out of slots 52 and 54 in levers 43 and 44 respectively. It is seen that when the lever 18 is in substantially the straight up and down position, pin 48 will be engaged in both slots 52 and 54, and when this condition occurs the gear trains in the transmission are in neutral condition. A spring 56 is provided to constantly urge the hand lever 18 into engagement with slot 54 in lever 44 which lever is operatively connected to the second-high gear train shifting arm 12.

Sealing cowl section 58 is placed over the gear shifting mechanism to protect it from the elements, and is secured on top of carpeting or floor board 59 by screws 60 which are screwed into the metal floor 62. Sealing cowl 61 through which extend levers 43 and 44 is clamped between support means 37 and floor 62.

Lever 43 is pivotally mounted at its lower portion on a stud 63 extending from a threaded bushing 64 threadably receiving the low-reverse linkage 66. The end of link 66 is threaded at 68 and is provided with nut 70 located adjacent bushing 64 for locking lever 43 on the link 66. Locking means 74 prevents lever 43 from slipping off of stud 63. The opposite end of link 66 is bent and extended through the low-reverse shifting arm 14 and pivotally held thereon by means of lock means 76.

Lever 44 is pivotally mounted on a stud 78 extending from a bushing 80 by means of lock means 82. Bushing 80 is initially slidable on link 84 and may be frictionally locked after it is adjusted against link 84 by means of a washer 86 and nut 88 threaded onto a threaded shaft 90 formed integrally with bushing 80.

Link 84 is pivotally mounted at its other end in leg 92 of a bracket 94 and secured therein by a lock washer 96. Bracket 94 is provided with another leg portion 98 into which link 100 is pivotally mounted in the same manner in which link 84 is mounted and is also pivotally mounted in the second-high shifting arm 12 and secured thereby by locking means 102. H-shaped bracket 94 is pivotally mounted at one end on a circular bearing stud 104 pivotal within the bearing section 106 of the bracket 94 and spring urged on either side by springs 108 and 110. Stud 104 is provided with a grooved end 112 over which is pivotally mounted an arm 114 secured to the transmission 10 by bolts 116. The other end of bracket 94 is provided with a resilient rubber grommet 118 receiving stud 120 bolted to an arm 122 which is in turn bolted to a rib 124 forming part of the automotive chassis.

From FIGURE 6, it is seen that linkages 100 and 66 are separated from each other by means of the bracket 94 which prevents them from being vibrated into contact with one another which could readily occur should linkage 100 to be connected directly to linkage 84. It is further noted that the vibration of the transmission when it is in low and reverse gear train is less troublesome than when it is in second and high and, therefore, the resilient vibration absorbing mounting bracket 94 is provided to interconnect sections 84 and 100 of the second-high linkage.

I claim:

A manually operable floor mounted gear shift mechanism for an automobile comprising a support bracket having means therein for securing the same to a vehicle floor, a shaft pivotally mounted in opposite sides of said bracket, a sleeve member rotatably supported on said shaft and having socket means disposed on opposite sides thereof, a gear shift stick having a yoke at one end thereof, bearing studs extending through the legs of said yoke and secured in said socket means to pivotally mount said stick, gear train selecting levers pivotally mounted on said shaft on opposite sides of said stick, one end of said levers having a flat side with a slot therein adjacent said stick, a pin secured to said stick and adapted to fit into said slots, said pin being sufficiently long to engage each of said slots simultaneously at one position of said stick, spring means engaging said stick and urging said pin into engagement with one of said slots, and the other end of said levers being adapted for operative connection to transmission shifting arms.

References Cited in the file of this patent
UNITED STATES PATENTS

| | | |
|---|---|---|
| 2,265,260 | Argo | Dec. 9, 1941 |
| 2,922,315 | Primeau | Jan. 26, 1960 |